United States Patent
Halim et al.

(10) Patent No.: US 6,304,881 B1
(45) Date of Patent: Oct. 16, 2001

(54) REMOTE DATA ACCESS AND SYNCHRONIZATION

(75) Inventors: Chris Halim; John W. Stossel, both of San Jose, CA (US)

(73) Assignee: Pumatech, Inc., San Jose, CA (US)

( * ) Notice: Subject to any disclaimer, the term of this patent is extended or adjusted under 35 U.S.C. 154(b) by 0 days.

(21) Appl. No.: 09/034,601

(22) Filed: Mar. 3, 1998

(51) Int. Cl.[7] .................................................. G06F 12/00
(52) U.S. Cl. ........................ 707/201; 707/203; 707/204
(58) Field of Search .................................. 709/227, 203, 709/201; 707/201, 540, 506, 203, 204; 345/331, 335, 333; 370/389; 395/200.03, 200.66; 235/379

(56) References Cited

U.S. PATENT DOCUMENTS

| | | | |
|---|---|---|---|
| 5,065,360 | 11/1991 | Kelly | 708/142 |
| 5,170,480 | 12/1992 | Mohan et al. | 711/115 |
| 5,261,094 | 11/1993 | Everson et al. | 707/201 |
| 5,278,978 | 1/1994 | Demers et al. | 707/101 |
| 5,315,709 | 5/1994 | Alston, Jr. et al. | 707/6 |
| 5,333,252 * | 7/1994 | Brewer, III et al. | 707/506 |
| 5,392,390 * | 2/1995 | Crozier | 345/335 |
| 5,596,574 * | 1/1997 | Perman et al. | 370/389 |
| 5,600,834 | 2/1997 | Howard | 707/201 |
| 5,630,081 * | 5/1997 | Rybicki et al. | 395/348 |
| 5,666,530 * | 9/1997 | Clark et al. | 14/20 |
| 5,666,553 * | 9/1997 | Crozier | 707/540 |
| 5,684,984 | 11/1997 | Jones et al. | 707/10 |
| 5,684,990 * | 11/1997 | Boothby | 707/203 |
| 5,689,706 | 11/1997 | Rao et al. | 707/201 |
| 5,701,423 | 12/1997 | Crozier | 345/335 |
| 5,706,452 * | 1/1998 | Ivanov | 345/331 |
| 5,708,840 | 1/1998 | Kikinis et al. | 708/105 |
| 5,710,922 | 1/1998 | Alley et al. | 707/201 |
| 5,727,202 | 3/1998 | Kucala | 707/10 |
| 5,729,735 | 3/1998 | Meyering | 707/10 |
| 5,745,712 * | 4/1998 | Turpin et al. | 345/333 |
| 5,758,150 | 5/1998 | Bell et al. | 707/10 |
| 5,758,355 | 5/1998 | Buchanan | 707/201 |
| 5,781,908 | 7/1998 | Williams et al. | 707/104 |
| 5,832,218 * | 11/1998 | Gibbs et al. | 709/203 |
| 5,870,765 | 2/1999 | Bauer et al. | 707/203 |
| 5,884,323 * | 3/1999 | Hawkins et al. | 707/201 |
| 5,884,324 * | 3/1999 | Cheng et al. | 707/201 |
| 5,892,909 * | 4/1999 | Grasso et al. | 709/201 |
| 5,926,824 * | 7/1999 | Hashimoto | 707/520 |
| 5,928,329 * | 7/1999 | Clark et al. | 709/227 |
| 6,141,664 | 10/2000 | Boothby | 707/201 |
| 6,212,221 * | 4/2001 | Wakayama et al. | 375/133 |
| 6,226,739 * | 5/2001 | Eagle | 713/1 |
| 6,233,452 * | 5/2001 | Nishino | 455/435 |

* cited by examiner

Primary Examiner—Thomas Black
Assistant Examiner—Charles L. Rones
(74) Attorney, Agent, or Firm—Fish & Richardson P.C.

(57) ABSTRACT

A method for partially synchronizing a local database stored on a local computer and a remote database stored on a remote computer. The method includes forming a message including information related to a local update of the local database, selecting a path from one or more communication paths coupling the local computer to the remote computer to pass the message to the remote computer, and transmitting data including the message to the remote computer over the selected path. The method can include determining whether the local update to the local database should be sent to the remote computer. The method includes receiving the data at the remote computer, processing the message included in the received data, and providing the information related to the local update to a remote application executing on the remote computer. A remote database coupled to the remote application is then updated using the information related to the local update. Information related to an update of the remote can also be selectively sent to update the local database. Messages sent between a local computer and a remote computer can be passed through a networked server computer, coupled by wired or wireless data networks to both the local computer and the remote computer.

5 Claims, 7 Drawing Sheets

REMOTE DATA ACCESS AND SYNCHRONIZATION

BACKGROUND

The invention relates to data access and synchronization from a remote computer.

Access to data is an important capability for users of computers that are physically remote from the computers holding the data. For example, a user of a mobile computer may need access to his electronic mail that is received and stored at a mail server computer on a local computer network at his home site. The user may also need to access and modify a calendar and address book, or access other database information that is maintained on an application or database server computer at his home site. In addition to using a remote computer, the user may at other times use a desktop computer that is directly connected to the local computer network at his home site to access and modify data that he previously accessed from the remote computer.

A remote computer may connect to an application or database server computer over one or more of a number of different communication paths. For example, the remote computer may connect to the server or to a gateway computer on a local network using a modem and a directly dialed telephone connection. Wireless access from the remote computer is also possible using a cellular telephone modem and a dialed telephone connection. Rather than establishing a telephone connection from the remote computer to the server or gateway computer, the remote computer may establish a telephone connection to an access point of a data network, such as the Internet. Communication between the remote computer and the server computer then passes through the telephone connection as well as through the data network. In addition, the remote computer may also communicate directly over a wireless data network, such as a cellular digital packet data (CDPD) network, or the ARDIS or RAM networks, which is coupled to the server computer or to the local network.

Communication paths between a remote computer and a server computer are typically significantly more limited than the communication path between a desktop computer and a server computer that are both directly coupled to a local computer network. Remote communication may be limited to data rates in the range of approximately 5–56 kb/s, while local network communication typically occurs at rates of 1–10 Mb/s or higher. In addition, latency of communication may be significant, several seconds in some wireless data networks, while typically being less than 10ms in the local network.

Software on a remote computer and on a server computer can take several different approaches to making use of the communication paths described above. One approach is to provide the remote computer access to a local computer network as if the remote computer were physically connected to the network. Essentially the same application programs and communication protocols are then used on the remote computer to access the server computer as on the local desktop computer. For example, in the case of electronic mail, a remote client can access a mail server using client application programs that use application layer communication protocols such as POP, SMTP, IMAP, or MAPI, to retrieve and post mail messages.

Computers, such as remote computers and desktop computers, that access a server may keep local copies of data stored on the server. When these computers are able to communicate with the server, they exchange all updated information thereby resulting in their local data being fully synchronized with the server after such communication.

Another approach to remote data access is to provide a pair of applications, one for execution on the remote computer, and another to act as a proxy or agent application executing at the user's home site. The proxy application interacts with the server application over a high data rate communication path such as over a local computer network. The communication protocol between the remote application and the proxy application is typically tailored to the type of data, for example tailored for mail, and to the characteristics of the data channel being used. The remote application can be used to simply view and remotely manipulate data on the server computer, or may keep a synchronized copy of the data.

Yet another approach uses a network mail server coupled to the user's home site over a data network such as the Internet. A pair of applications, one executing at the remote computer and the other executing at the network server, are used to access mail messages stored on the network server over a wireless data network, such as the ARDIS network. For a mail message to be accessible from the remote computer, the message must have been explicitly addressed and sent to the network mail server by the sender, or automatically forwarded from a mail server at the user's home site. This automatic forwarding may depend on criteria such as the sender, other information in the message header, or information in the body of the message itself.

SUMMARY

In one aspect, in general, the invention is a method for partially synchronizing a local database stored on a local computer and a remote database stored on a remote computer. The method includes forming a message including information related to a local update of the local database, selecting a path from one or more communication paths coupling the local computer to the remote computer to pass the message to the remote computer, and transmitting data including the message to the remote computer over the selected path. The method can include determining whether the local update to the local database should be sent to the remote computer. The method includes receiving the data at the remote computer, processing the message included in the received data, and providing the information related to the local update to a remote application executing on the remote computer. The method also includes updating a remote database coupled to the remote application using the information related to the local update.

In a second aspect, in general, the invention is a method for providing a remote computer access to a local database. The method includes sending a message, including information related to a local update to the local database over a first data network to a networked computer, and receiving the message at the networked computer. A networked database hosted on the networked computer is then updated using the information related to the local update. The method also includes accessing and updating the networked database from a remote computer over a second data network, and sending a message that includes information related to the update of the networked database from the networked computer over the first data network. The message that includes the information related to the update of the networked database is received and the local database is updated using the information related to the update of the networked database.

In a third aspect, in general, the invention is a system that includes a local database, an agent for accessing information related to a local update of the local database and for forming a message including that information for transmission to a remote computer, and a message router for accepting the message from the agent, and for selecting a path from one or more communication paths coupling the message router and the remote computer to pass the message to the remote computer. The system also includes a local communication interface for accepting data including the message and transmitting the data to the remote computer over the selected path.

Aspects of the invention include one or more of the following features.

Information related to a remote update of the remote database is accepted from a remote application. A return path is selected from the one or more communication paths coupling the local computer to the remote computer to transmit the information related to the remote update to the local computer, and the information related to the remote update is transmitted to the message router over the selected return path. The local database is updated using the information related to the remote update.

Determining whether the local update to the local database should be sent to the remote computer includes accessing a local application coupled to the local database using a first application communication protocol, such as MAPI, and providing the information to the remote application uses a second application communication protocol, such as POP.

The local database and the remote database include electronic mail messages, or include personal calendar information.

Transmitting data to the remote computer over a selected path for a message includes transmitting the data to a networked server over a first data network, such as the Internet, storing the data in a networked database hosted on the networked server, providing the data from the networked database to the remote computer over a second communication network, such as a wireless data network. The message can be encrypted prior to transmission to the networked server and decrypted after receipt of the message at the remote computer.

An advantage of the invention is that a remote user has the capability to maintain and manipulate copies of data on his remote computer, without requiring that the data on the remote computer be fully synchronized with that on the server. Updates to the data on the remote computer can be selectively reflected on the server. Similarly, updates on the server computer can be selectively reflected on the remote computer. This approach of partial synchronization provides most of the benefits of complete synchronization with significantly reduced communication requirements compared to complete synchronization. Partial synchronization avoids unnecessary expense if the cost of the communication is based on usage, and also avoids unnecessary delays resulting from large backlogs of data to transmit.

Another advantage of the invention is that a remote user can use standard client application programs on the remote computer, rather than customized application programs, while realizing other advantages of this invention.

Yet another advantage of the invention is that effective use of communication channels is made by taking into account the communication characteristics, such as data rate and latency, as well as communication cost structures, such as per message, per byte, and per minute based charges. For example short messages over a channel with a high per message cost can be avoided.

In the case in which a network server is used in conjunction with an application or database server at the user's home site, this invention has the advantage that data is synchronized not only on the remote computer and the server computer, but also on the network server. In this case, the invention also has the additional advantage that additional data security for data stored on the network server can be provided using encryption of that date.

Other features and advantages of the invention will be apparent from the following description, and from the claims.

DESCRIPTION

Figure 1A:
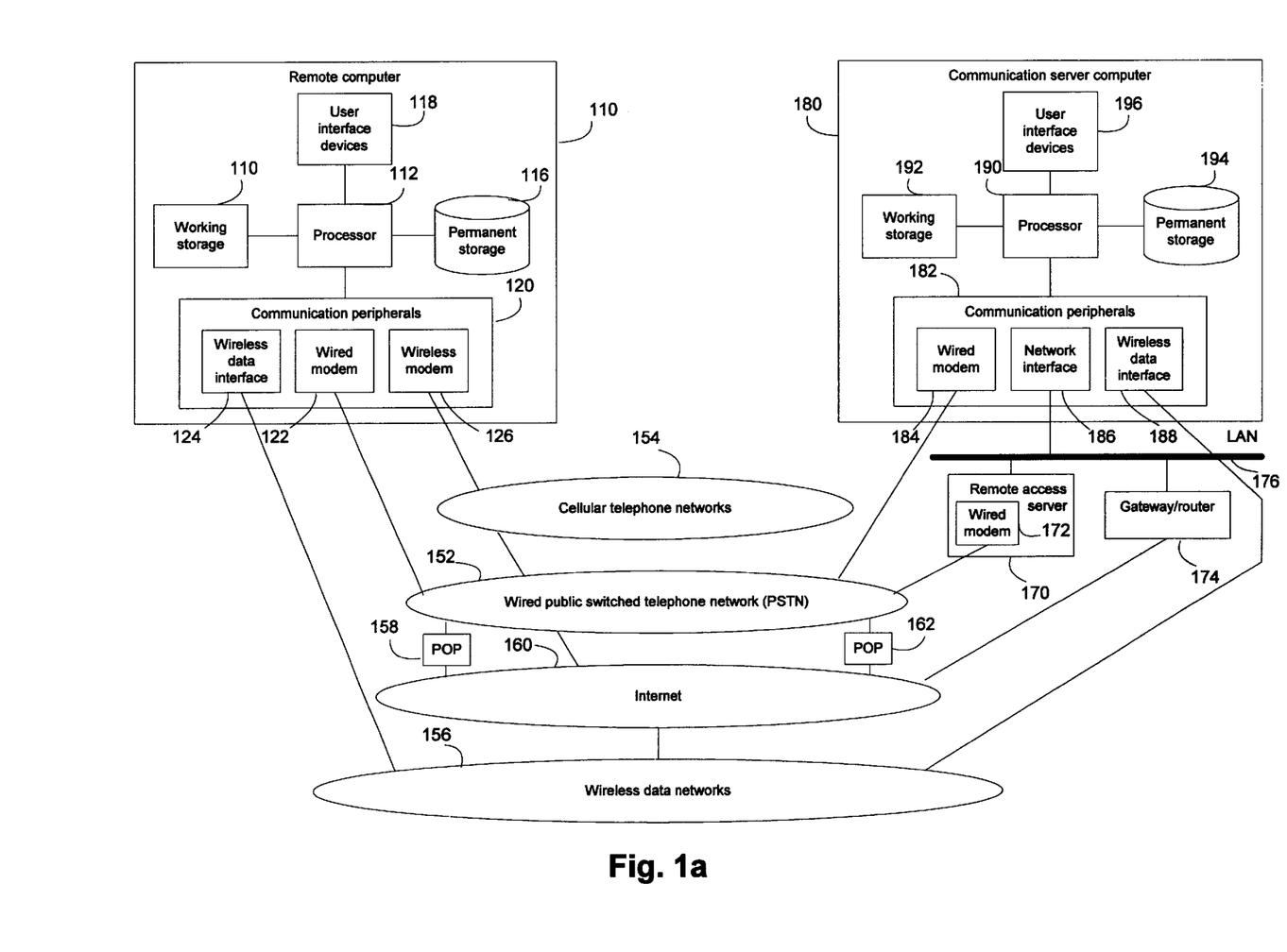
FIG. 1a is a remote computer coupled to a communication server computer through various telephone and data networks.
Figure 1B:
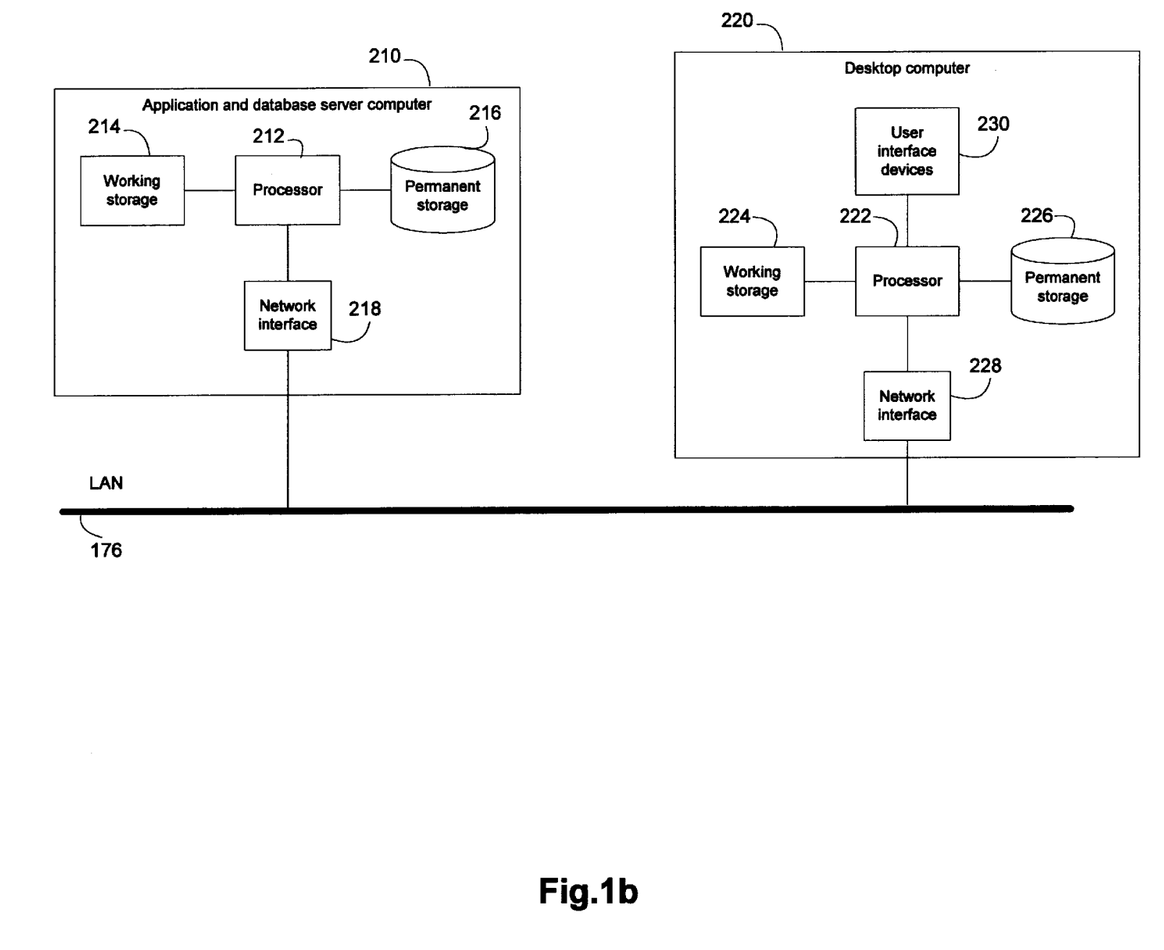
FIG. 1b is an application database server and a desktop computer coupled to a communication server computer over a local area network.

Referring to FIGS. 1a and 1b, a remote computer 110 is coupled to a communication server computer 180 through one or more paths through a communication network infrastructure made up of various telephone and data networks. Remote computer 110 is a lap-top, general-purpose computer, but could also be one of a variety of personal digital assistants (PDAs), or a special-purpose device such as an enhanced cellular telephone or paging receiver. Communication server computer 180 is a general purpose computer that is coupled to an application and database server 210 over a high-speed local computer network (local area network, LAN) 176, communicating at rates of 1–10 kb/s or higher. Remote computer 110 communicates with server computer 180 over one or more of a variety of communication paths through the communication network infrastructure. These paths exhibit various communication characteristics. The communication paths include the following:

A bidirectional data stream over a dialed wired telephone connection from a wired modem 126 at the remote computer, over wired public switched telephone network (PSTN) 152 to wired modem 184 at the server computer. The data stream provides a data link for Internet Protocol (IP) data packets sent using the PPP protocol. The data rates on this path are typically limited to approximately 33 kb/s over standard telephone lines, although rates as high as 128 kb/s are possible over digital (ISDN) telephone lines. Cost of communication is not typically dependent on the amount of data sent, but may depend on the length of time connected. A modem 172 in a remote access server 170 coupled to a communication server 180 over LAN 176 may be used rather than using modem 184 in the communication server.

A bidirectional data stream over a dialed wired telephone connection from modem 126 at the remote computer, over PSTN 152, to an Internet Point-of-Presence (POP) 158. The Internet is then used for the remainder of the path, passing from POP 158 through Internet 160 to a gateway/router 174, and then from gateway/router 174 over LAN 176 to server computer 180. The cost of communication may depend on the length of time connected, due to a toll call being used, or due to charges from an Internet Service Provider that operates POP 158.

The above two paths may use a wireless cellular modem 126 rather than wired modem 122 at remote computer 110. The wireless telephone call passes through cellular telephone network 154 to PSTN 152 and either terminates at a wired modem 172, 184 at the user's site, or at Internet POP 158. Current cellular modem data rates are limited to less than 15 kb/s over analog cellular telephone connections. A significant charge for connection time may be incurred from the cellular telephone service provider.

Rather than establishing a wireless telephone connection whenever communication between the remote computer and the user's site is needed, a wireless data interface 124, such as a packet radio modem using the CDPD protocol, can be used to access a wireless data network 156. Wireless data interface 124 provides a relatively low speed data channel. In the case of a CDPD modem, wireless network 156 is coupled to Internet 160. The communication path to the user's site then passes through the Internet and gateway/router 174 to communication server computer 180. Current data rates are limited to approximately 9 kb/s and a latency of up to several seconds. Cost of communication may be based on the total amount of data transferred. Other wireless data network connections are available using the ARDIS or RAM systems. In these systems, wireless data interface 124 is used at remote computer 110, and a compatible wireless data interface 188 is used at communication server 180. The cost of communication can be based on a combination of amount of data transferred as well as the number of messages sent. It can be expensive to send many short messages that do not contain much information.

Wireless data interface 124 can also be a two-way paging receiver. Communication rates are very limited using such systems. Communication from the remote computer using the pager is also very limited. Communication cost is also based on amount of data transferred and number of messages.

Remote computer 110 includes communication peripherals 120, including one or more of wired modem 122, wireless modem 126, and wireless data interface 124 described above. The remote computer also includes a general purpose processor 112 coupled to communication peripherals 110, for example over a communication bus. The processor is also coupled to working storage 114, such as dynamic RAM, as well as permanent storage 116, for example, a magnetic disk or an EPROM. User interface devices 118, such as a graphical display, keyboard, and trackball, are also coupled to processor 112 and are used by a remote user to interact with application programs or to configure and maintain communication software on the remote computer.

At the user's home site, communication server computer 180 includes communication peripherals 182, including a network interface 186 coupled to a LAN 176, and may include one of wired modem 184 and wireless data interface 188 depending on the type of remote communication paths supported by the communication server. Communication server 180 has a general purpose processor 190, working storage 192, permanent storage 194, and user interface devices 196. The communication server may also have access to gateway/router 174 and remote access server 172 through network interface 186 and LAN 176. Gateway/router 174 provides an interface to Internet 160. Remote access server 170 provides access to wired modem 172 which may be shared with other computers on LAN 176.

Referring to FIG. 1b, also coupled to the LAN 176 is an application and database server computer 210, which includes a processor 212, working storage 214, permanent storage 216 on which data is stored, and a network interface 218 coupled the processor to LAN 176.

Also coupled to LAN 176 is a desktop computer 220 which may be used by the user when he is at his home site. The user can access application and database server 210 from two different computers, remote computer 110 and desktop computer 220. The desktop computer includes a processor 222, working and permanent storage 224, 226, network interface 228 and user interface devices 230.

Figure 2A:
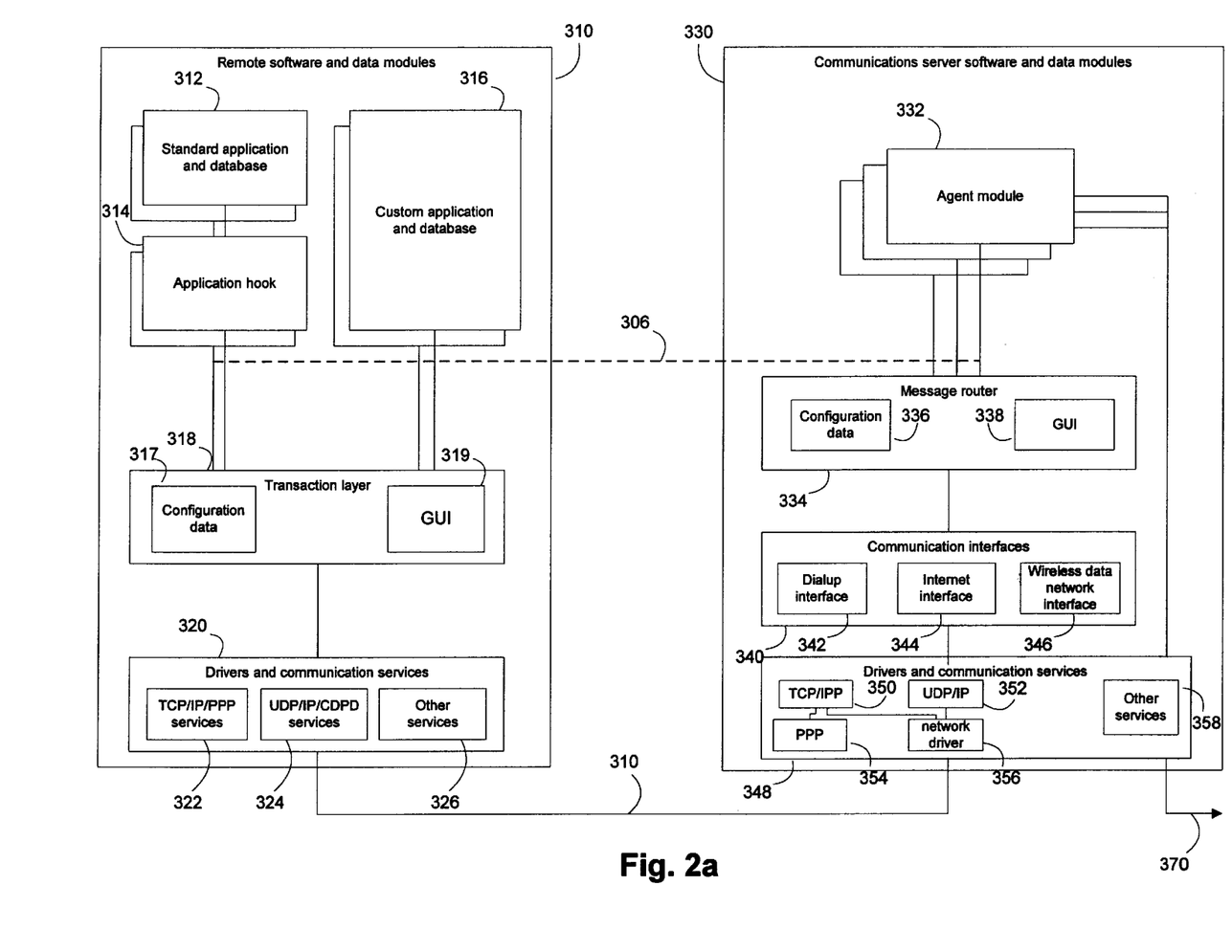
FIG. 2a is software modules on a remote computer and on a communication server computer.
Figure 2B:
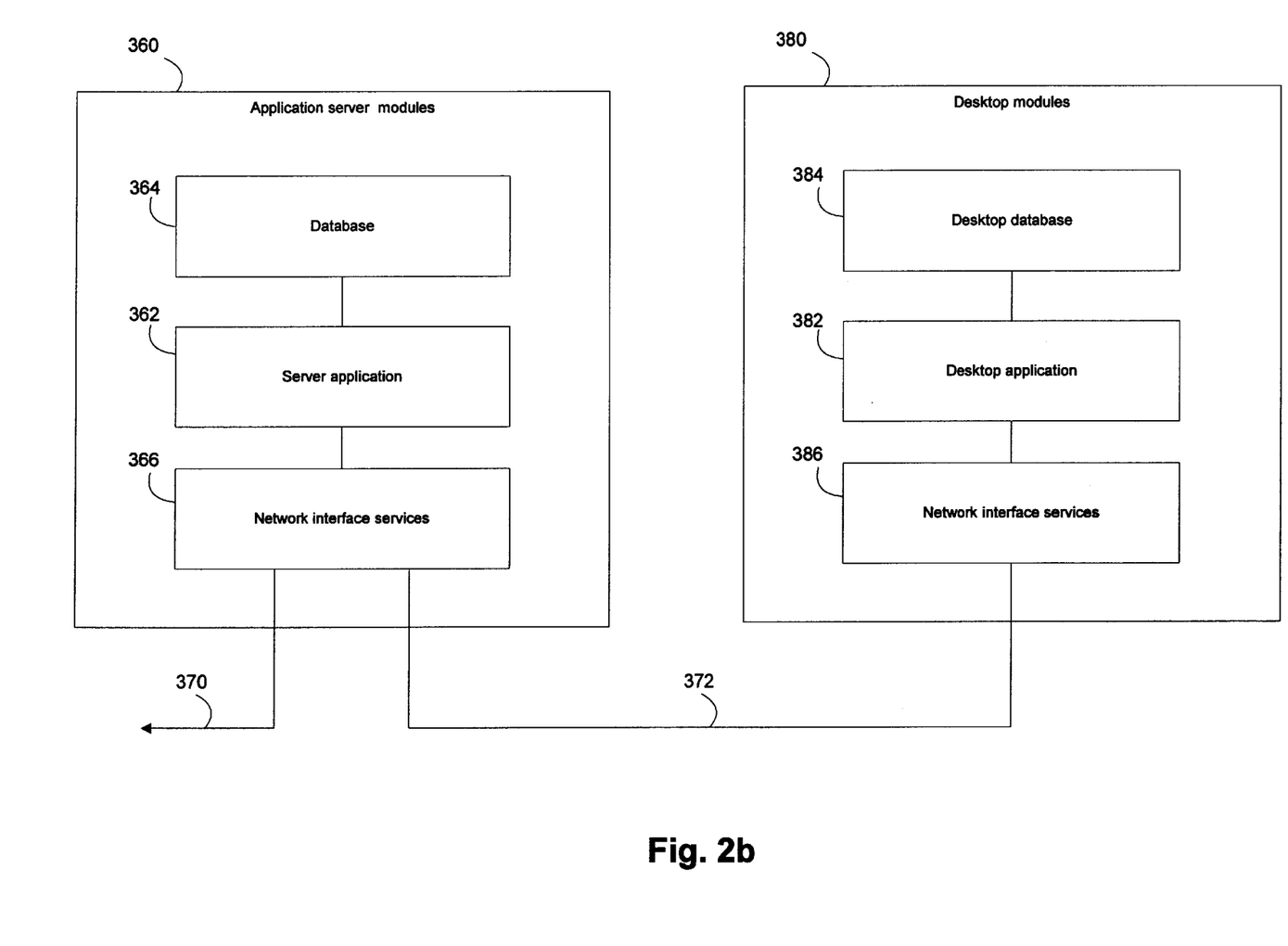
FIG. 2b is software modules on an application and database server and on a desktop computer.

Referring to FIG. 2a, remote modules 310 include instructions and data hosted on remote computer 110 and communication server modules 330 include instructions and data hosted on communication server computer 180. Referring again to FIG. 1a, the remote modules are stored in working and permanent storage 114, 116 and are executed by processor 112 on remote computer 110. Similarly, the communication server modules are stored in working and permanent storage 192, 194 and executed by processor 190 on communication server computer 180. Drivers and communication services 320 in remote modules 310 shown in FIG. 2a are coupled to drivers and communication services 348 in communication server modules 330 along a communication path 310. Referring again to FIG. 1a, communication path 310 passes through communication peripherals 120 on remote computer 110, through one or more of telephone and data networks 152, 154, 156, 160, and through communication peripherals 182 on communication server computer 180. Referring to FIGS. 2a and 2b, communication server modules 330 are coupled over communication path 370 (passing through LAN 176) to application server modules 360, hosted on application and database server computer 180 (shown in FIG. 1b). Application server modules 360 are also coupled over communication path 372 (passing through LAN 176) to desktop modules 380, hosted on desktop computer 220 (shown in FIG. 1b).

Referring again to FIG. 2a, remote modules 310 and communication server modules 330 provide a mechanism for applications on the remote computer to communicate over a telephone or data network with corresponding agent modules on the communication server. In particular, a standard application and database 312 communicates with the communication server via an application hook module 314. The application hook module provides a standard interface to application 312, for example using industry standard MAPI or POP protocols, and sends messages to and receives messages from a corresponding agent module 332 at the communication server. Custom application and database 316 can also interchange messages with a corresponding agent module 332 at the communication server without requiring the services of an application hook module using an interface that may be particular to transaction layer 318. An agent module 332 at the server computer communicates with standard and custom applications on remote computers, and couples those remote applications to a corresponding server application 362 (shown in FIG. 2b) executing on an application and database server computer 210 (shown in FIG. 1*b*). Desktop software and data modules 380 are hosted on a desktop computer 220, and include a desktop application 383 which also communicates with server application 362. In general, agent module 332 and desktop application 382 communicate with server application 362 using the same or similar protocols in order to access and manipulate data in database 364. In particular, for an electronic mail application such as Microsoft Exchange server, agent module 332 and desktop application 382 communicate with server application 362 using the MAPI communication protocol.

Communication between an application hook 314 or a custom application 316 on a remote computer and an agent module on the communication server is message based. Communication logically flows between an application hook 314 or a custom application 316 and an agent module 332 along a logical communication path 306. Logical communication path 306, including the support for addressing, acknowledgments, and data link control, is provided by transaction layer 318 and driver and communication services 320 on the remote computer, message router 334, communication interfaces 340 and drivers and communication services 348 on the communication server, and communication path 310 corresponding to the peripheral devices and network connections between the remote computer and the communication server computer.

Transaction layer 318 on the remote computer provides four basic services to an application hook or a custom application. The first two services allow an application hook or a custom application to register and unregister itself. An application registers itself by providing a symbolic name (i.e., a character string). The transaction layer can then route messages received from the communication server that are addressed to the application with that registered name. The other two basic services are used to send and to receive messages. A message sent by an application hook or a custom application includes a data portion that does not to be interpreted by the transaction layer, and a portion that identifies a communication server and an agent on that server using symbolic names. Transaction layer 318 includes configuration data 317 that is maintained by the remote user using a graphical user interface (GUI) 319. This configuration data provides information necessary for transaction layer 318 to determine which communication path from the remote computer to the communication server computer should be used for any message received from an application or application hook. In particular one function of the transaction layer is to map the symbolic name for the communication server into a network address, such as a telephone number, an IP address, or an ARDIS address, needed for delivery of the data in the message.

If transaction layer 318 is configured to send a message over a wireless data network, the transaction layer accesses lower-level communication services associated with that network. For example, if a cellular CDPD network is to be used, transaction layer 318 calls UDP related routines in UDP/IP/CDPD interface 324. If the message is larger than can be handled by a single UDP message (datagram) due, for example, to constraints imposed by the network, the transaction layer sends the message in a sequence of UDP datagrams.

At the communication server computer, drivers and communication services 348 receive the message and buffer it until one of communication interfaces 340 requests data.

One of communication interfaces 340 then requests data from drivers and communication services 348, accepts the data, and reconstructs a message, for example, combining multiple data packets if necessary to form a single message. The message, including the name of the addressed agent, is then available to message router 334.

Message router 334 provides a communication interface to agent modules 332. Agent modules register themselves by name, in a similar manner as application hooks and custom applications register themselves with the transaction layer on the remote computer. When an agent module 332 requests data from message router 334, the message router determines whether any messages for that agent are currently queued to be delivered and provides any such messages to the agent.

An application hook 314 or custom application 316 on the remote computer has three options related to acknowledgment of messages sent to an agent 332. The first choice is that no acknowledgment is provided. The application receives no indication if a message is lost or delayed. The second choice is that once the message is reconstructed by one of the communication interfaces 340 at the communication server, an acknowledgment is sent back to the sending application hook or custom application. The third choice is for the sending application or application hook to receive an acknowledgment when message router 334 provides the message to the destination agent module.

The acknowledgment messages sent back to the remote computer may have different levels of urgency. For example, a confirmation that a request for a stock trade has been received by an agent module may require quick acknowledgment, possibly in the order of seconds, while acknowledging the transfer of messages containing an updated address in an address book may be much less urgent. Most typically, application hooks and custom applications are designed so that acknowledgments of successful transmission of messages is not needed, relying instead on application layer protocols above the message transport over logical communication path 306 to deal with communication errors and delays.

Messages from an agent module at the communication server to an application hook or custom application on the remote computer are sent in a similar fashion. The agent provides a message addressed to a particular application and remote computer to message router 334. The message router includes configuration data 336 that is maintained by a user using GUI 338. The configuration data includes information that is used by the message router to determine over which communication path to transmit the message to the remote computer. The message router then passes the message to one of the communication interfaces 340 based on the communication path chosen. Configuration data 334 also includes information needed by the communication interface translating the symbolic name of a remote computer to an address suitable for delivery of the message over the communication network used for the selected communication path.

The chosen communication interface accepts the message and then either passes the message immediately to the appropriate modules in driver and communication services 348, or buffers the message for later transmission if the remote computer cannot be accessed at that time.

In order to optimize communication over a particular type of communication path, a communication interface, for example, wireless data network interface 346, may buffer several messages before transmission. This allows the communication interface to aggregate the messages into a larger data packet for transmission over the communication path. This may be desirable to reduce communication cost on a path where there is a per-message cost. In order that a message not be delayed too long using such an aggregation mechanism, the agent module may specify a time limit by which time a message needs to be sent to the remote computer.

A communication interface may also be configured to prevent transmission of excessively long messages. For example, there may be a size limit for messages for transmission over a slow or expensive communication path.

Referring to FIG. 2a, and as described above, application hook 314 and custom application 316 make use of the communication mechanism for transmission of messages over logical communication path 306. Delivery of messages is not necessarily instantaneous and may be significantly delayed. Delivery is not necessarily reliable, application hooks and custom applications may choose not to require end-to-end acknowledgments. The application hook or custom application may rely on application layer protocols for error handling.

Referring to FIGS. 2a and 2b, agent module 332 couples the application hook or custom application to server application 362. Agent module 332 communicates over communication path 370 to application server modules 360. Agent module 332 communicates with server application 362 using an appropriate application layer communication protocol. Agent module 332 may include library routines which provide a software interface within the agent module and provides support for the application layer protocol, and communicates using drivers and communication services 348 with the server application. An example of use of such a library mechanism is an agent module which uses a dynamically linked library (DLL) implementing a MAPI interface for communicating with a Microsoft Exchange server application.

In the case of electronic mail, agent module 332 is a mail agent. The mail agent performs one or more of the following functions. Periodically, the mail agent queries server application 362 to determine whether new mail has been received for a particular remote user. The server application maintains a database 364, in this case a database of mail messages. If the server application determines that unread mail is stored in database 364, this unread mail is provided to the mail agent. The mail agent determines whether the received mail should be forwarded to the remote computer. This decision may be based on a variety of factors, including the sender or other information in the message header, the length of the message, or information related to attachments to the message. Having decided to forward a message to a remote computer, the mail agent constructs a message including the mail message and addressed by name to the remote computer and the remote mail application, and then provides the message to message router 334.

At the remote computer, a standard application 312 is used to access electronic mail. A corresponding application hook 314 has previously registered itself with transaction layer 318 with the name of the remote mail application. This application hook receives the message sent by the mail agent, extracts the mail message and provides the mail message to the standard mail application by writing the mail message in a shared directory of a file system on the permanent storage of the remote computer. Other methods of communication between the application hook and the standard application may also be used, depending on the standard interface supported by the application.

The user of the remote computer interacts with the mail application, reading the newly received message. Having read the mail message, the mail application marks the mail message as "read" so that it is not presented to the user again as a newly received message. In order that the same mail message is not presented as newly received when the user accesses database 364 from desktop computer 220 at a later time, the application hook sends a message to the mail agent with instructions to mark that mail message as read. The mail agent then communicates with server application 362 and the message stored in database 364 is marked as read. Similarly, if the remote user files the mail message in a folder or directory, or deletes it altogether, instructions to reflect those changes are sent to the mail agent. It may also be possible for the user to explicitly manipulate the local copy of the mail database without reflecting the changes in the database on the application server computer. For example, the user may delete messages on the remote computer to recover limited storage space, without having those mail messages deleted on the application server. Also, messages that are read on the remote computer may not be marked as read on the application server, for example, if the remote user wants to have them presented as unread when he accesses the mail database from the desktop computer at a later time.

Note that the remote mail application maintains a database as if it is totally synchronized with the mail database on the application server. However, due to factors including the mail agent selectively forwarding messages, a user choosing not to reflect changes such as deleting and marking messages as read, and the delay and unreliability of message delivery, the databases may be only partially synchronized.

A user may access an application server from a desktop application 382 prior to messages sent from the mail agent being delivered to the remote computer. For example, newly arrived mail messages may have been sent by the mail agent through the message router and may be queued for transmission in the wireless data network interface. If the user now reads those mail messages from the desktop computer, the mail agent determines that delivery of previously sent messages is no longer necessary and sends a "flush" message through the message router. The message router passes this flush message to the communication interface where the mail message can be erased if it has not yet been sent.

In the case of electronic mail, the application hook or custom application and the mail agent communicate using an application layer protocol that is not specific to any particular mail system. In this way, a mail client for one type of mail system, for example Microsoft Exchange, can communicate with a mail application server for another mail system, for example Lotus CC:Mail.

In addition to electronic mail, similar cooperating application hook and agent modules support data access and partial synchronization of personal information databases, for example containing a personal calendar and address book. In addition, custom applications may provide access to a database, such as an inventory database for a mobile inventory control application.

Figure 3:
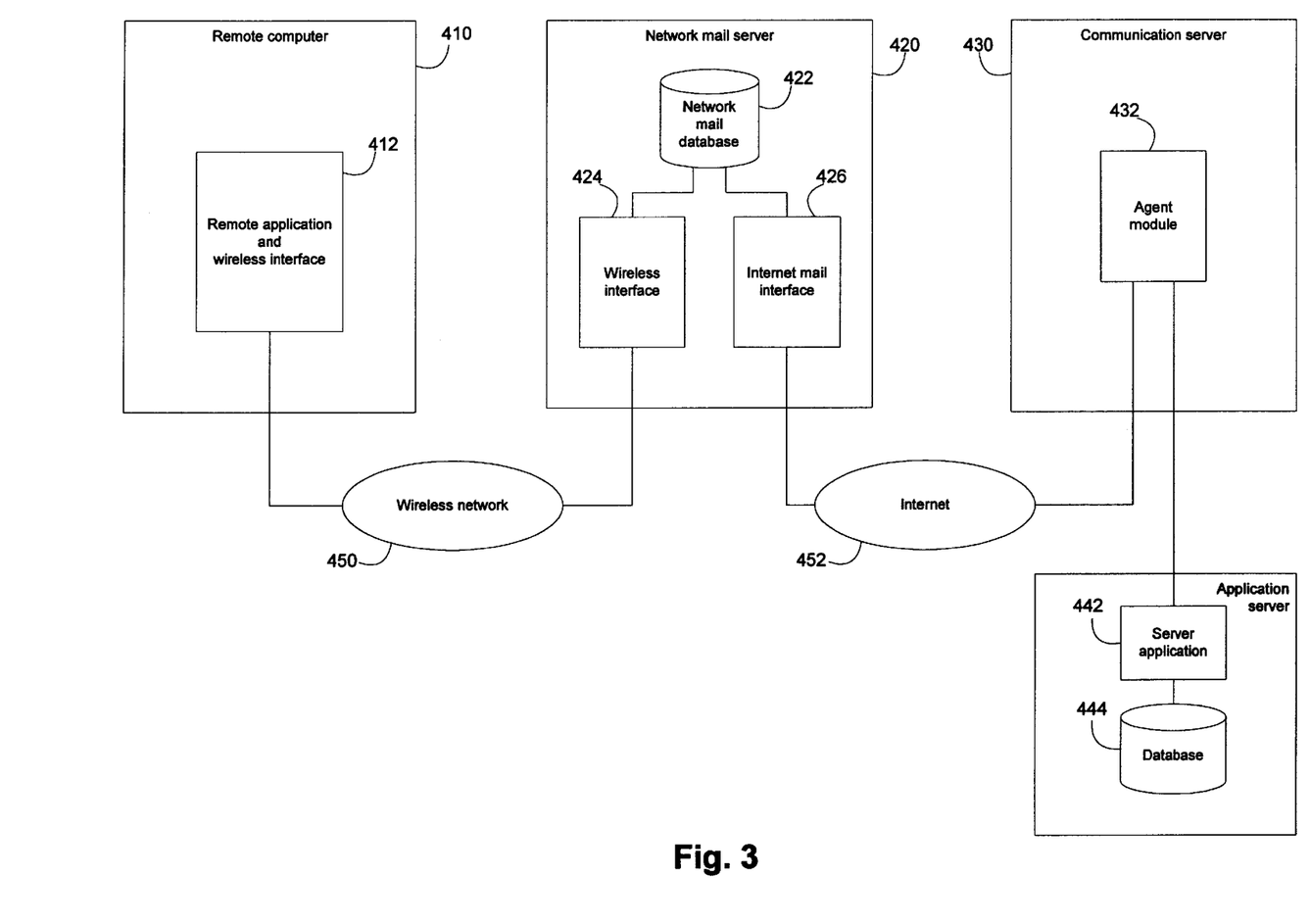
FIG. 3 is a network server coupled to a communication server over the Internet and to a remote computer over a wireless network.

Referring to FIG. 3, a second configuration involves a network mail server 420 coupled to a communication server 430 over Internet 452 and coupled to a remote computer 410 over a wireless network 450. In an arrangement similar to that of the previously described configurations, an agent module 432 executes on communication server 430 and interacts with a server application 442 that maintains a database 444 on an application server 440. The communication server and the application server are situated at the user's home site, while the network mail server is geographically separated from the communication and application servers, as well as from the remote computer.

Network mail server 420 is configured to receive electronic mail for registered users of that server, to maintain that mail in network mail database 422, and to post mail through the Internet on behalf of the registered users. The mail is sent and received by Internet mail interface 426 using the SMTP application layer protocol. When incoming mail is received by the network mail server, it is stored in network mail database 422. A remote user accesses the stored mail from a remote computer 410 using remote application and wireless interface 412 executing on the remote computer. The remote computer and the network communication server are coupled by a wireless network 450, for example an ARDIS packet radio network. A wireless interface 424 on the network mail server provides the remote computer access to the network mail database through the wireless network. In this configuration, the remote application either does not maintain its own local copy of mail, or its local copy is synchronized with the copy in network database 422. One mode of making use of the network mail server is to forward mail received at application server 440 to network mail server 420 for access by a remote user.

Rather than forwarding mail from the application server 440 to network mail server 420, agent module 432 is used to maintain partial synchronization between network mail database 422 and database 444 on the application server. After a mail message for a user is received and stored in database 444, agent module 432 determines whether that message should be sent to the user at a remote computer. If it should be sent, agent module 432 sends a message to network mail server 420 so that the mail message can be stored in network database 422 where it is accessible to the user from remote computer 410.

Figure 4:
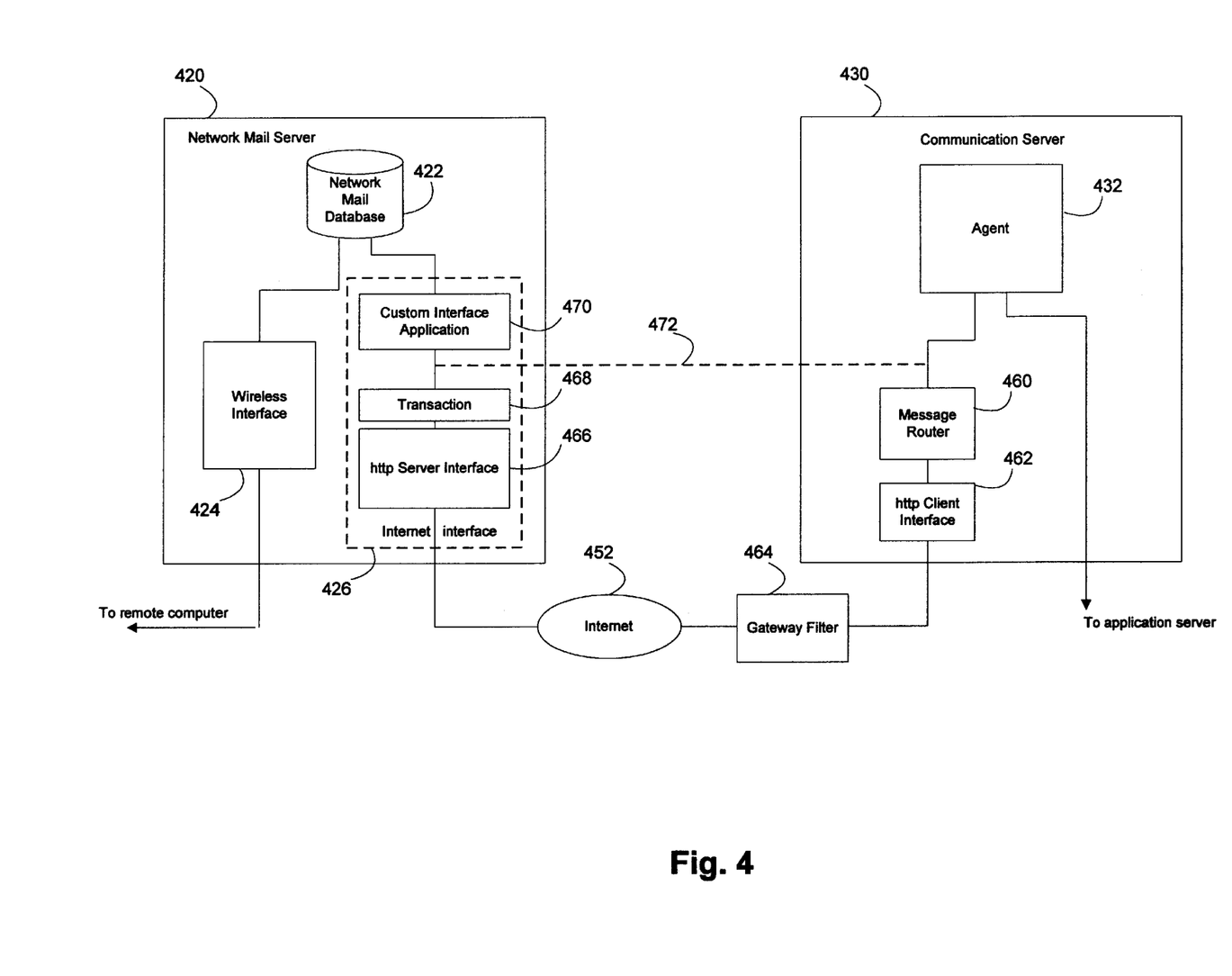
FIG. 4 is a network server coupled to a communication server using http modules.

Referring to FIG. 4, communication server 430 includes a message router 460 and a hyper-text transport protocol (http) client interface 462 on the communication path joining agent module 432 and network mail server 420. Internet interface 426 on the network mail server includes an http server interface 466, a transaction layer 468, and a custom interface application 470.

If the remote user accesses mail stored in network mail database 422 and updates the database, for example, by marking messages as read, deleting messages, or by filing messages in folders, custom interface application 470 send a message to agent module 432 with instructions to update database 444. Similarly, if the user posts a message, that message is sent by custom interface application 470 to agent module 432 and then to server application 442 from where the message is transmitted to the intended recipient. Custom interface application 470 and agent module 432 communicate along a logical communication path 472 using a message passing technique such as that described in the previous configuration. In particular, messages sent between custom interface application 470 and agent module 432 have the identical form as messages sent between an application hook 314 and an agent module 332 shown in FIG. 2*a*. Furthermore, agent module 432 is not necessarily aware that it is communicating with network mail server 420 rather than with an application hook 314 on a remote computer. The agent module addresses messages symbolically and provides them to message router 460. Custom interface application 470 addresses messages symbolically and provides them to transaction layer 468 for delivery to agent module 432.

In certain installations, a gateway/router on the path between communication server 430 and the Internet 452 may include a gateway filter 464 that limits communication, for example, limiting communication to selected communication ports or to communication using selected application protocols for security reasons. In the configuration shown in FIG. 4, gateway filter 464 allows communication using the hyper-text transport protocol (http) passing messages formatted according to the hyper-text markup language (HTML). In order to pass messages between message router 460 and transaction layer 468 without filtering, http client interface 462 embeds outgoing messages in HTML format communication using a tunneling approach. Http server interface 466 extracts the message from the HTML data stream and provides it to transaction layer 468. Messages from transaction layer 468 to message router 460 are provided in HTML format responses to requests from http client interface 462 to http server interface 466, for example in a polling arrangement in which the client interface periodically requests messages from the server interface.

Figure 5:
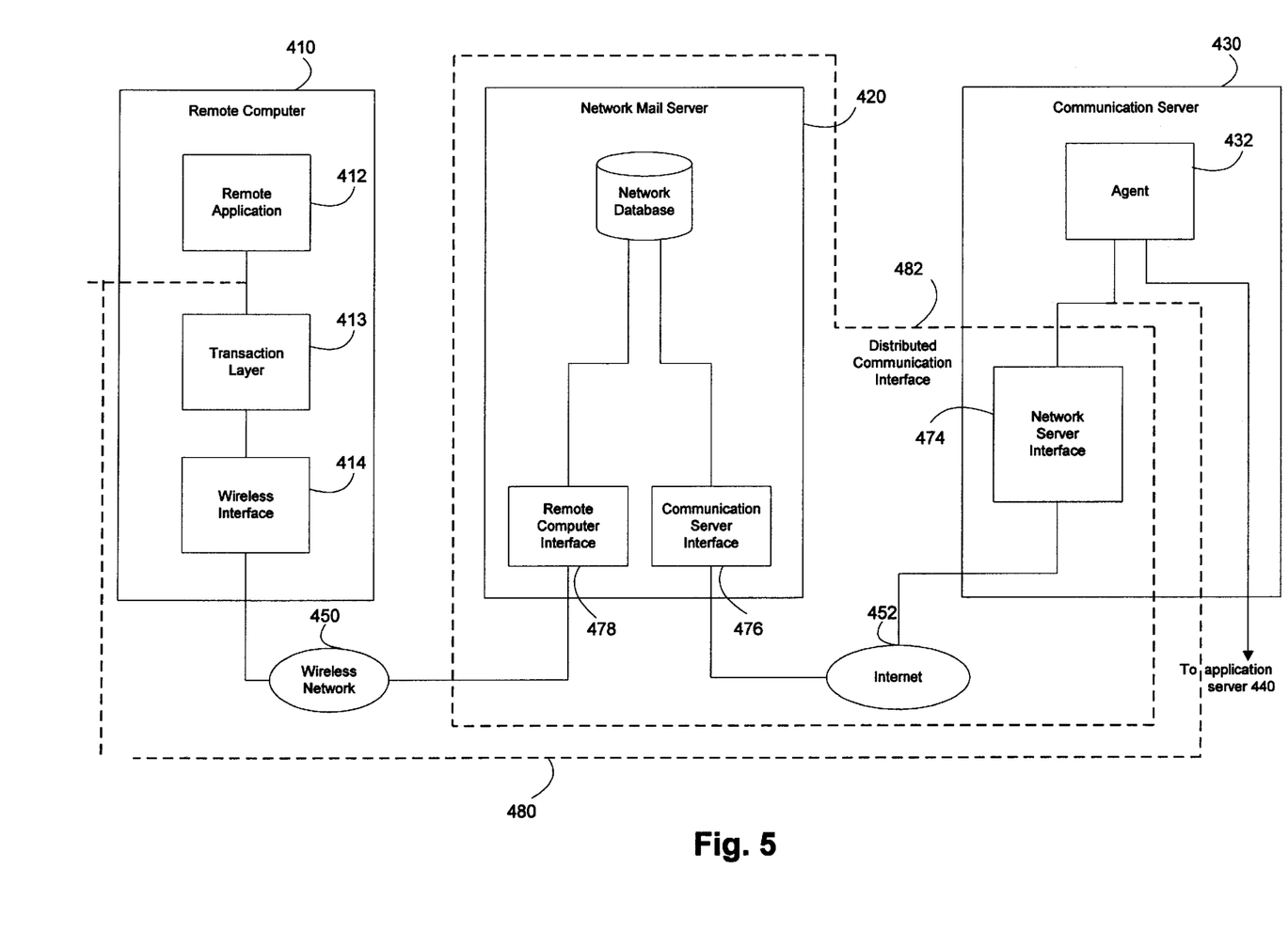
FIG. 5 is a network server which forms part of a distributed communication interface.

Referring to FIG. 5, a third configuration also makes use of network mail server 420 for accessing and synchronizing data between remote computer 410 and the application server 440. Agent 432 is coupled to application server 440 as in the previous configurations. In order to send a message to the remote computer, agent 432 passes a message to a network server interface 474 that passes the message to a communication server interface 476 on network mail server 420. Network server interface 474 include a message router and an http client interface, and communication server interface 476 includes a http server interface, a transaction layer, and a custom interface application, as in the previously described configuration. Communication server interface 476 stores received messages in network mail database 422 for later retrieval from the remote computer. When remote computer 410 and network mail server 420 are in contact over wireless network 450, messages destined for the remote computer that are stored in the network mail database are passed through remote computer interface 478, wireless network 450, and wireless interface 414, and provided to transaction layer 413. Transaction layer 413 communicates with a remote application 412 which accepts the message. The remote application may be the combination of an application hook and a standard application, or a custom application as in the previous configurations. Messages from transaction layer 413 to agent 432 are similarly buffered in network mail database 422. In this way, remote application 412 and agent 432 are coupled by a logical communication path 480. The combination of network server interface 474, communication server interface 476, network mail database 422, and remote computer interface 478 logically forms a distributed communication interface 482 for communicating between an agent and a remote computer over a wireless network. In this way, neither agent 432 nor transaction layer 413 are necessarily aware that messages are buffered on a network mail server 420 rather than being sent directly between communication server 430 and remote computer 410.

In this third configuration, messages stored in network mail database 422 can be encrypted to provide additional security. In particular, the message content may be encrypted and decrypted in network server interface 474 and wireless interface 414. The network mail server does not require access to the content of messages sent by agent 432 or remote application 412.

Also in the third application, remote computer interface 478 may be identical to wireless interface 424 in the second configuration. That is, the network mail server may not be aware of the nature of the remote application and wireless interface executing on the remote computer. In this way, the network mail server can concurrently support the communication approaches described in the second and third configurations described above.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for partially synchronizing a server personal information database stored on a server computer and a remote personal information database stored on a remote computer, the method comprising:

determining the type of communication path over which an update from the server personal information database will be sent to the remote personal information database, the type of communication path being one of a plurality of possible types of communication paths, wherein the possible types of communications paths include at least one type of wireless communication path for which the cost of communication is based on usage and for which the speed of communication is less than for a second type of communication path;

deciding whether to send the update information from the server personal information database to the remote personal information database or whether not to send the update information;

if the decision is to send the update information, routing the information across the communication path, and updating the remote personal information database using the update information; and if the decision is not to send the update information, not routing the information across the communication path, and not immediately updating the remote personal information.

2. The method of claim 1 wherein the personal information database comprises personal calendar and address information.

3. The method of claim 1 wherein the second communication path comprises the public switched telephone network.

4. The method of claim 1 wherein the second communication path comprises an Internet connection.

5. The method of claim 1 further comprising determining the type of communication path over which an update from the remote personal information database will be sent to the server personal information database, and deciding whether to send the update information from the remote personal information database to the server personal information database or whether not to send the update information.

* * * * *

UNITED STATES PATENT AND TRADEMARK OFFICE
CERTIFICATE OF CORRECTION

PATENT NO. : 6,304,881 B1 Page 1 of 1
APPLICATION NO. : 09/034601
DATED : October 16, 2001
INVENTOR(S) : Christopher Halim and John W. Stossel It is certified that error appears in the above-identified patent and that said Letters Patent is hereby corrected as shown below:

On the Title Page, item (56) References Cited, U.S. PATENT DOCUMENTS, at "5,596,574", "Perman et al." should be --Perlman et al.--.

Title page, item (56) References Cited, U.S. PATENT DOCUMENTS, insert the following references:

| | | | |
|---|---|---|---|
| --5,448,718 | 9/1995 | Cohn et al. | 707/204 |
| 5,699,517 | 12/1997 | Yamasaki | 395/200.03 |
| 5,838,923 | 11/1998 | Lee et al. | 395/200.66 |
| 6,039,245 | 3/2000 | Symonds et al. | 235/379-- |

Signed and Sealed this

First Day of April, 2008

JON W. DUDAS
*Director of the United States Patent and Trademark Office*